J. E. BECKMAN.
COMBINED SPRING AND SHOCK ABSORBING MEANS FOR VEHICLES.
APPLICATION FILED DEC. 14, 1914.
1,171,307.
Patented Feb. 8, 1916.
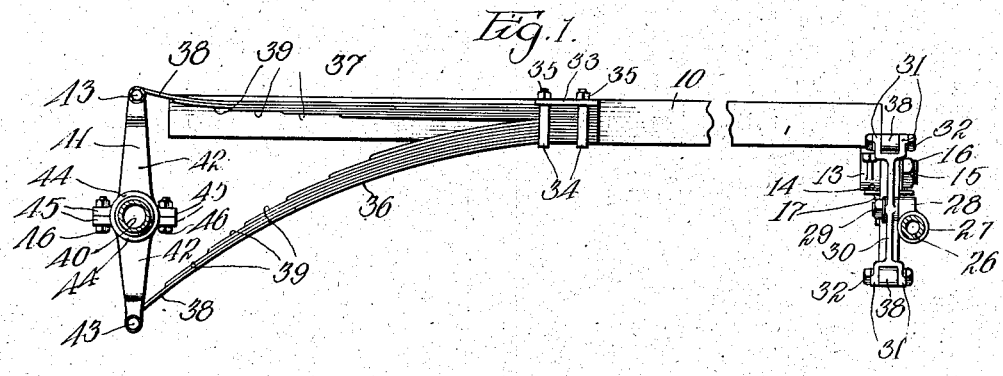
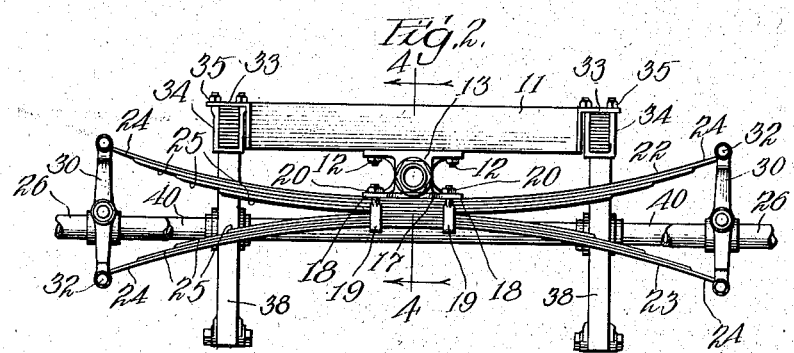
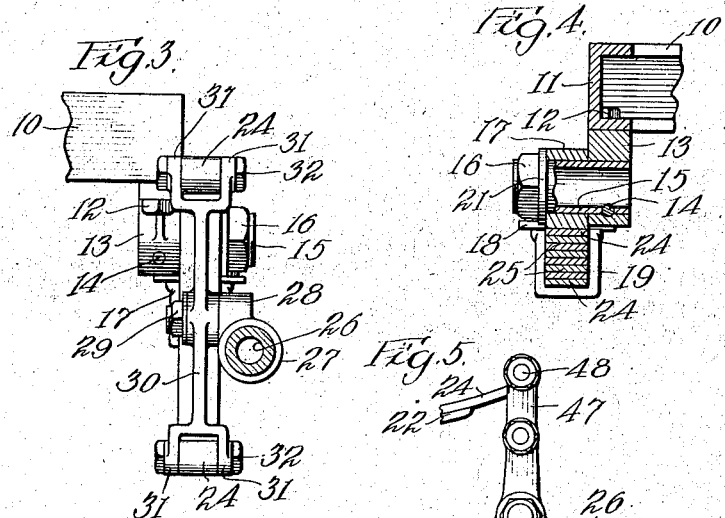
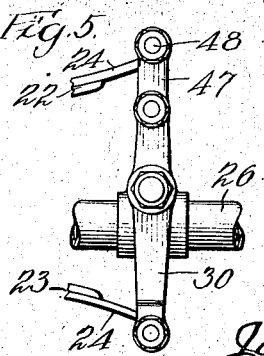
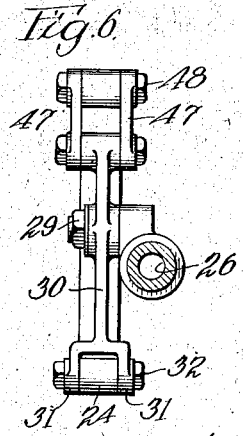
Witnesses:
Leo J. Dumais
A. S. Phillips
Inventor:
John E. Beckman
By Chas. C. Tillman Atty.

UNITED STATES PATENT OFFICE.

JOHN E. BECKMAN, OF CHICAGO, ILLINOIS.

COMBINED SPRING AND SHOCK-ABSORBING MEANS FOR VEHICLES.

1,171,307.  Specification of Letters Patent.  Patented Feb. 8, 1916.

Application filed December 14, 1914. Serial No. 877,081.

*To all whom it may concern:*

Be it known that I, JOHN E. BECKMAN, a citizen of the United States, residing at the city of Chicago, in the county of Cook and State of Illinois, have invented certain new and useful Improvements in Combined Spring and Shock-Absorbing Means for Vehicles, of which the following is a specification.

This invention has relation to means for yieldingly supporting vehicle bodies or frames and absorbing the shocks thereof, and particularly those of automobiles, and it consists in certain peculiarities of the construction, novel arrangement and operation of the various parts thereof, as will be hereinafter more fully set forth and specifically claimed.

Some of the salient objects of the invention are to provide combined spring and shock absorbing means of the above named type, which shall be simple and inexpensive in construction, strong, durable and easily applied to the automobile or other vehicle, and with its parts so made and arranged with respect to the vehicle that a three point suspension will be provided thereby, for the support of the vehicle body or frame.

Other objects and advantages will become apparent as the nature of the invention becomes better understood from the following description and accompanying drawings, in which—

Figure 1 is a view in side elevation of a vehicle frame or chassis of an automobile, showing it shortened for the convenience of illustration, and illustrating it mounted on a spring and shock absorbing support embodying one form of the invention; Fig. 2 is a front view thereof in elevation, showing the front axle broken in order to disclose the mechanism rearwardly thereof. Fig. 3 is an enlarged side view of the front part of the vehicle frame, showing the means of connecting the front members of the spring and shock absorbing device thereto and to the front axle, which is shown in cross section; Fig. 4 is a cross sectional view taken on line 4—4 of Fig. 2, looking in the direction indicated by the arrows; Fig. 5 is a front view of a portion of the front axle of the vehicle illustrating a modified form of one of the pivoted brackets for supporting the ends of the front spring mounted thereon, and Fig. 6 is a side view thereof, showing the front axle in cross section.

Like numerals of reference refer to like parts throughout the different views of the drawing.

The reference numeral 10 designates the vehicle frame or chassis for an automobile, which may be made of any suitable material, but preferably of channel iron and substantially rectangular in shape. Secured to the lower middle portion of the front or transverse portion 11 of the frame 10 by means of bolts 12 is a bracket 13, which has rigidly secured thereto by means of a pin 14 or otherwise, a forwardly projecting pivot or stub shaft 15, which may be tubular in form as shown in Fig. 4, and may have its front portion screw threaded to engage a nut 16 for the purpose to be presently explained. Loosely mounted on the pivot or stub shaft 15, in front of the bracket 13, is another bracket 17, which has at its lower portion laterally extended flanges 18, through each of which is extended a substantially U-shaped bolt 19, each of which bolts embraces the members of the front spring near their central portions, and are secured at their upper ends in suitable openings within the flanges 18, by means of nuts 20, engaging the upper ends of said U-shaped bolts. The bracket 17, being loosely mounted on the pivot or stub shaft 15, so as to rock or swivel thereon, is held against displacement by means of a washer 21 surrounding the shaft 15 and the nut 16, which is in screw threaded engagement with the front end of said shaft. The members of the front spring of the device are designated as units by the reference numerals 22 and 23, and each of said members consists of a combination spring of a bowed shape; that is, each of the members 22 and 23 includes a main bow spring 24 and a series of correspondingly shaped leaves or springs 25, mounted on the adjacent surfaces of the springs or members 24, as is clearly shown in Fig. 2 of the drawing. The leaves or auxiliary springs 25 of each of the main springs 24, are graduated in length in such a manner that the spring or leaf 25 adjacent to the spring 24 is longer than the leaf or spring 25 adjacent to the first named leaf, and so on throughout the series of leaves. This arrangement is carried out in the construction of both of the members 22 and 23 of the front spring. As shown in Fig. 2 of the drawing, the members 22 and 23 are located with their convexed portions in opposed relation, and are securely held at about their middle by means of the U-bolts 19 to the bracket 17, which, as before stated, is loosely mounted or swiveled on the pivot 15, carried by the bracket 13 on the front portion of the vehicle frame.

Mounted on the front axle 26, outwardly from each side of the frame 10, or near each end of said axle, is a collar 27, each of which has extended rearwardly from its upper portion an orificed lug 28, in each of which lugs is located a pivot 29, on each of which pivots is mounted an arm 30, having at each of its ends prongs 31. The prongs 31 of each pair are connected by a bolt or rod 32, with which rods or bolts the ends of the main members 24 of the front spring are connected in any suitable manner, but usually by being bent around the same.

At about its middle portion each side of the frame 10, is provided with an outwardly extended bracket 33, usually made of angle iron, and suitably secured to the frame. Secured at their front ends to each of the brackets 33, preferably by means of U-bolts 34, extended through the horizontal or lateral portions of the brackets 33, and nuts 35, on said bolts, are the members 36 and 37 of the rear springs and shock absorbers of the device. Each of the members 36 and 37 comprises a main spring or member 38, and a series of leaves or springs 39 graduated in length in the same manner as the leaves or springs employed in the members of the front spring, and above described. As shown in Fig. 1, the members 36 and 37 are curved in opposite directions from one another, or are located so that their convexed portions will be in opposed relation.

Mounted on the rear axle 40, near each of its ends is an arm, which is designated as a whole by the reference numeral 41, and by preference consists of two parts 42, each having at its outer end a transversely disposed pin or projection 43, and at its inner portion a semi-circular bearing 44 to partially surround the rear axle. Each of the parts 42 of each of the arms 41, is preferably provided at its inner end with laterally extended flanges 45, through suitable openings, in which bolts 46 may be extended for securing the members 42 together and around the rear axle. Any suitable means, such as a collar surrounding the rear axle on each side of the portions 44, of the arm, and secured to the axle in any suitable manner, may be employed for preventing the arms moving longitudinally on said axle, and it is obvious that similar or other suitable means may be employed for preventing longitudinal movement of the collars 27 on the front axle.

In the modified form of the pivoted arms or brackets for supporting the ends of the front spring shown in Figs. 5 and 6 of the drawing, the construction is identical with that shown in Fig. 3, and above described, except that the forks or prongs 31, on the upper ends of each of the arms or brackets 30 are omitted, and a pair of links 47 are pivotally connected to the upper end of each of said arms, which links are united at their outer ends by a bolt 48, to which the ends of the main springs 24 are secured, preferably by means of an eye formed thereon. In this modified construction, which may be used instead of the construction shown in Figs. 2 and 3, it is evident that as the links 47 are pivoted to the upper portion of the arms 30, they will have a slight independent movement of said arms.

From the foregoing and by reference to the drawing, it will be readily understood and clearly seen that by equipping an automobile or a vehicle with my improvements a combined spring or yielding and shock absorbing support for the body of the frame will be furnished in such a manner as to have three points of suspension; that is, one point at the middle of the front spring, and two points on the rear axle. In the movement of the vehicle, when the wheels thereof pass over obstructions, it is manifest that the lower members 23 of the front spring will support the front part of the load, and the lower members 36 of the rear springs will support the rear portion of the weight or load, and said members will be depressed, thus causing them to expand, which operation will force the arms 30 and 41 outwardly at their lower ends and inwardly at their upper ends, the upper members 22 and 37 of the front and rear springs respectively yielding sufficiently for this purpose. On the rebound the upper members 22 and 37 of the front and rear springs respectively will receive pressure, which will cause them to expand and force the upper portions of the arms 30 and 41 outwardly. From this operation, it will be seen and understood that very effective means for yieldingly supporting the body or frame of a vehicle and for absorbing the shocks thereof will be furnished.

While I have shown and described the invention in its preferred form, it will be evident that the various details of construction disclosed may be changed in many ways without departing from the spirit of the invention, and I therefore do not wish to be limited to the exact structure shown.

Having thus fully described my invention what I claim as new and desire to secure by Letters Patent is—

1. In a combined spring and shock absorbing device, a pair of springs each having a single arch with its convexed surface opposed to the other, a frame connected to and uniting said springs in contact with one another, and an arm pivotally supported between its ends and connected at its ends to the said springs near one of their ends.

2. In a combined spring and shock absorbing device, a pair of oppositely and singly arched springs, a frame connected thereto between their ends, and an arm pivotally supported between its ends and connected at its ends to said springs on each side of their middle portions.

3. In a combined spring and shock absorbing device, a pair of oppositely and singly arched springs, a frame pivotally connected thereto between their ends, and an arm pivotally supported between its ends and connected at its ends to said springs on each side of their middle portions.

4. In a combined spring and shock absorbing device, a pair of oppositely and singly arched springs, a frame connected thereto between their ends, and an arm pivotally supported between its ends and loosely connected at its ends to said springs on each side of their middle portions.

5. In a device of the character described, the combination with a support, of a pair of spaced apart arms pivotally mounted thereon, a pair of springs each having a single arch with its convexed surface opposed to the other and connected at their ends to the said arms outwardly from the pivots thereof.

6. In a device of the character described, the combination with an axle of a vehicle, of an arm mounted thereon for pivotal movement transversely of the same, a pair of springs connected at one of their ends to said arm on each side of its pivot, and a frame connected to said springs near their other ends.

7. In a device of the character described, the combination with an axle of a vehicle, of an arm centrally mounted thereon near each of its ends for pivotal movement transversely of the axle, a frame located near said axle, a pair of springs located on each side of the frame and having connection near one of their ends with the same and at their other ends with said arms on each side of their pivots.

8. In a device of the character described, the combination with an axle of a vehicle, of an arm centrally mounted thereon near each of its ends for pivotal movement transversely of the axle, a frame located near said axle, a pair of oppositely curved springs located on each side of the frame and having connection near one of their ends with the same and at their other ends with said arms on each side of their pivots.

9. In a device of the character described, the combination with an axle of a vehicle, of an arm mounted between its ends on the axle near each of the ends of the latter for pivotal movement longitudinally with respect to said axle, a pair of springs each having a single arch opposed to the other and connected at its ends to said arms on each side of the pivots thereof, and a frame connected to the springs between their ends.

10. In a device of the character described, the combination with an axle of a vehicle, of an arm mounted between its ends on the axle near each of the ends of the latter for pivotal movement longitudinally with respect to said axle, a pair of springs each having a single arch opposed to the other and connected at its ends to said arms on each side of the pivots thereof, and a frame connected to the springs between their ends.

11. In a device of the character described, the combination with an axle of a vehicle, of an arm mounted between its ends on the axle near each of the ends of the latter for pivotal movement longitudinally with respect to said axle, a pair of springs connected at its ends to said arms on each side of the pivots thereof, and a frame pivotally connected to the springs between their ends.

JOHN E. BECKMAN.

Witnesses:
 CHAS. C. TILLMAN,
 A. S. PHILLIPS.